(12) United States Patent
Kinugasa (10) Patent No.: US 9,332,203 B2
(45) Date of Patent: May 3, 2016

(54) PHOTOELECTRIC CONVERSION APPARATUS AND IMAGING SYSTEM

(71) Applicant: CANON KABUSHIKI KAISHA, Tokyo (JP)

(72) Inventor: Tomohisa Kinugasa, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 44 days.

(21) Appl. No.: 14/283,103

(22) Filed: May 20, 2014

(65) Prior Publication Data

US 2014/0346321 A1 Nov. 27, 2014

(30) Foreign Application Priority Data

May 24, 2013 (JP) ................................. 2013-110247

(51) Int. Cl.
| | |
|---|---|
| *H01L 27/00* | (2006.01) |
| *H04N 5/378* | (2011.01) |
| *H04N 5/232* | (2006.01) |
| *H04N 5/361* | (2011.01) |
| *H04N 5/363* | (2011.01) |

(52) U.S. Cl.
CPC ........... *H04N 5/378* (2013.01); *H04N 5/23212* (2013.01); *H04N 5/361* (2013.01); *H04N 5/363* (2013.01)

(58) Field of Classification Search
CPC .............................. H04N 5/2312; H04N 5/378
USPC ............................ 250/214 AG, 214 A, 214 R
See application file for complete search history.

(56) References Cited

U.S. PATENT DOCUMENTS

| | | | | | |
|---|---|---|---|---|---|
| 4,556,910 | A | * | 12/1985 | Tisue ................... | H04N 5/2173 348/241 |
| 6,459,078 | B1 | * | 10/2002 | Fowler ................... | H04N 5/361 250/208.1 |

FOREIGN PATENT DOCUMENTS

| | | |
|---|---|---|
| JP | 2000-78472 A | 3/2000 |
| JP | 2005-321313 A | 11/2005 |

* cited by examiner

*Primary Examiner* — Thanh Luu
(74) *Attorney, Agent, or Firm* — Canon USA, Inc. IP Division (57) ABSTRACT

A photoelectric conversion apparatus includes a photoelectric-conversion element configured to output electric charges generated by photoelectric conversion to a first node, and an accumulation circuit having an input terminal connected to the first node and being capable of changing an integral capacitance value. The number of drain or source of a MOS transistor in an OFF state connected to the first node is one.

12 Claims, 10 Drawing Sheets

PHOTOELECTRIC CONVERSION APPARATUS AND IMAGING SYSTEM

BACKGROUND OF THE INVENTION

1. Field of the Invention

One disclosed aspect of the embodiments relates to a photoelectric conversion apparatus and an imaging system.

2. Description of the Related Art

An AF sensor described in Japanese Patent Laid-Open No. 2000-78472 is an example of a technology in an output of a photoelectric conversion unit is input to a differential amplifier circuit, an output of the differential amplifier circuit is input to a memory and a voltage follower circuit (hereinafter, called a follower circuit), and an output of the voltage follower circuit is input to an inverting input terminal of the differential amplifier circuit. In recent years, auto-focus performance in low luminance has gained attention. An AF sensor under low luminance increases the signal-to-noise (S/N) ratio of signal by increasing an electric charge conversion coefficient to relatively reduce an influence of circuit noise or accumulating an optical signal of several hundred ms, that is a relatively long time to gather many electric charges. In general, signal deterioration under low luminance in long-period accumulation may be caused by dark current noise and a minute leakage current of a circuit. In order to reduce such dark current noise, it is effective that each pixel is configured with an embedded photodiode structure and a transfer MOS structure. However, because an AF sensor monitors an amount of electric charges accumulated in a photodiode at all times for implementing an AGC function, it is required to directly connect the photodiode and a readout circuit and reset switch to continuously transfer the generated photocarriers to the readout circuit. In this case, because a depletion layer of the photodiode is in contact with a silicon interface, a signal in a long-period accumulation period under low luminance is influenced by dark current noise due to crystal lattice defects and impurities on the silicon surface. A signal in a long-period accumulation period under low luminance is further influenced by a leakage current when a reset switch normally including a MOS transistor is turned off. A leakage current when a reset switch is turned off is not only a source-drain leakage current called a sub-threshold leakage current. A drain-well leakage current dependent upon a gate-source voltage called Gate Induced Drain Leakage (hereinafter, called GIDL) may be a leakage current caused when a reset switch is turned off and may need to be taken into consideration.

A trade-off between a circuit operation range and a leakage current due to GIDL described in Japanese Patent Laid-Open No. 2000-78472 will be described. A relationship between a source potential and a drain current with a fixed gate potential in the vicinity of a sub-threshold region of a MOS transistor will be described. A sub-threshold leakage current decreases as a source potential decreases, but the leakage current of the GIDL increases with a certain level of potential or lower. As in Japanese Patent Laid-Open No. 2000-78472, in a case where the potential of a photodiode changes while accumulating photocarriers, the difference between the initial potential of the photodiode and a leakage tolerant potential of the MOS transistor corresponds to an operation voltage range. In other words, there occurs a tradeoff between a wider operation voltage range and an increase of GIDL leakage current.

A method may be considered which uses an accumulation circuit for a readout circuit in order to acquire a wider operation voltage range of a photodiode and suppress a leakage current due to GIDL by reducing the gate-source potential difference when a reset MOS transistor is turned off. For example, use of an accumulation circuit may be considered which switches the integral capacitance denoted by the reference numeral 30m in FIG. 2 in Japanese Patent Laid-Open No. 2005-321313.

Referring to Japanese Patent Laid-Open No. 2005-321313, FIG. 2, when switches SW31 and SW32 are turned off to perform long-period accumulation for increasing an electric charge conversion coefficient, the drain voltage fluctuation caused by a leakage current due to GIDL occurring in the switch SW32 may fluctuate the potential of the output terminal of a photodiode through the capacitance C32. In other words, because the number of positions where a leakage current due to GIDL occurs is increased to two, that is, the switch SW31 and the switch SW32, the use of an accumulation circuit may cancel the effect of a reduced gate-source potential difference when a reset MOS transistor is turned off.

SUMMARY OF THE INVENTION

One disclosed aspect of the embodiments provides a photoelectric conversion apparatus including a photoelectric-conversion element configured to output electric charges generated by photoelectric conversion to a first node, and an accumulation circuit having an input terminal connected to the first node and being capable of changing an integral capacitance value, wherein number of drain or source of a MOS transistor in an OFF state connected to the first node is one.

Further features of the disclosure will become apparent from the following description of exemplary embodiments with reference to the attached drawings.

DESCRIPTION OF THE EMBODIMENTS

First Exemplary Embodiment

Figure 1:
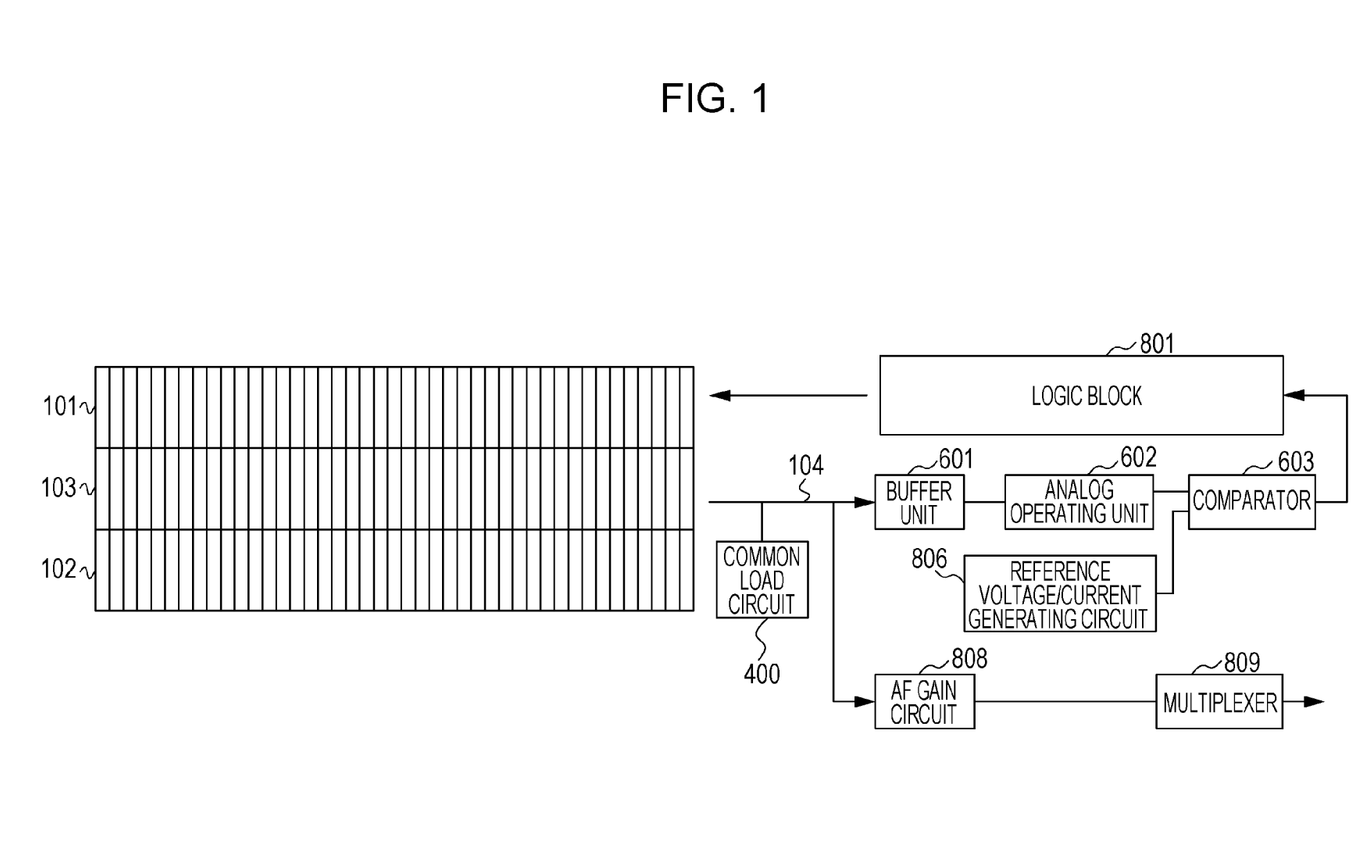
FIG. 1 is a block diagram illustrating a configuration example of an AF sensor having a photoelectric conversion apparatus.
Figure 2:
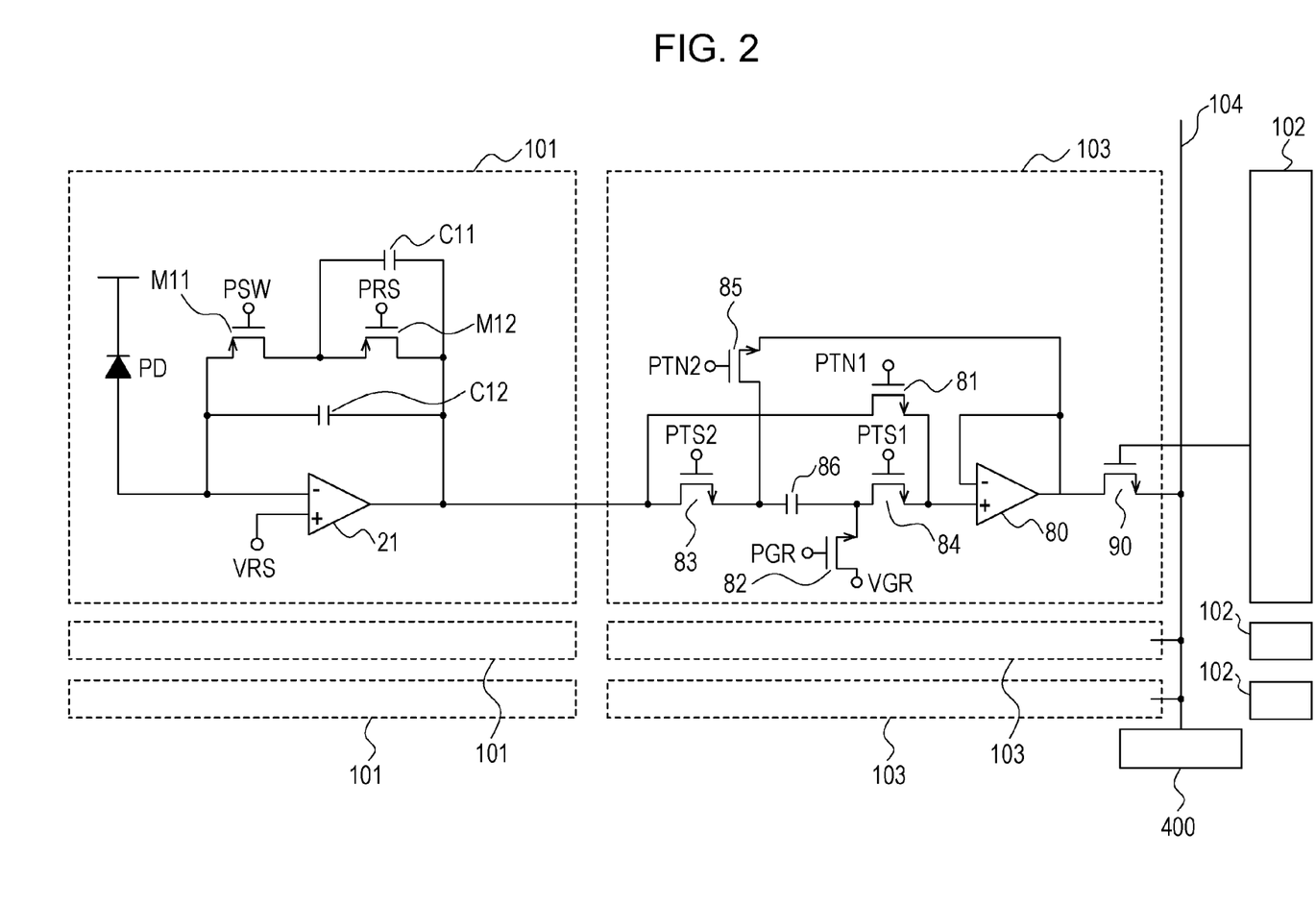
FIG. 2 is a circuit diagram illustrating a first exemplary embodiment.

FIG. 1 is a block diagram illustrating a configuration example of a focus detection apparatus for auto-focus having a photoelectric conversion apparatus according to a first exemplary embodiment. The focus detection apparatus for auto-focus is an auto-focus (AF) sensor. The AF sensor includes signal holding units 101, shift registers 102, signal processing circuits 103, a common signal line 104, a common load circuit 400, a logic block 801, a reference voltage/current generating circuit 806, a buffer unit 601, an analog operating unit 602, a comparator 603, an AF gain circuit 808, and a multiplexer 809. Each signal holding unit 101 includes a photodiode, and the one-dimensionally arranged photodiodes configure a linear sensor. The buffer unit 601, analog operating unit 602 and comparator 603 configure an automatic gain adjusting circuit (hereinafter, called an AGC circuit) which performs accumulation control over the signal holding units (linear sensor) 101. As illustrated in FIG. 2, the plurality of signal processing circuits 103 are provided correspondingly to the plurality of signal holding units 101.

Next, operations of the AF sensor will be described. First, after blocks of a peripheral circuit including the photodiodes of the signal holding units 101 are initialized, the photodiodes of the signal holding units 101 convert light to electric charges and start an operation of accumulating electric charges. The electric charges occurring in the photodiodes of the signal holding units 101 are held in the signal holding units 101 and at the same time are input to input terminals of the signal processing circuits 103. In a period for accumulating electric charges, the plurality of signal processing circuits 103 output the highest value and the lowest value of values of signals input from the signal holding units 101 through the common signal line 104 simultaneously in a plurality of units or in a time-division manner by using the common load circuit 400 as a driving source. The buffer unit 601 buffers the highest value and the lowest value output from the signal processing circuits 103. The analog operating unit 602 receives the highest value and the lowest value output from the buffer unit 601, acquires a difference between the highest value and the lowest value and outputs the result to the comparator 603. The comparator 603 compares an accumulation-termination determining level generated by the reference voltage/current generating circuit 806 and an output signal level of the analog operating unit 602. When the difference between the highest value and the lowest value is higher than the accumulation-termination determining level, the output signal from the comparator 603 is inverted, and an AGC comparator signal that informs the determination of the accumulation termination is output from the comparator 603 to the logic block 801. When the logic block 801 receives the AGC comparator signal, the logic block 801 determines whether the electric charge accumulation in the diodes of all of the signal holding units 101 is to be ended or to be continued by changing the accumulation-termination determining level. If it is determined that the electric charge accumulation is to be terminated, the logic block 801 controls the signal holding units 101 so as to terminate the electric charge accumulation and holds signals of the electric charges. After the electric charge accumulation termination, the plurality of shift registers 102 output readout pulse signals to the corresponding plurality of signal processing circuits 103. The plurality of signal processing circuits 103 in response to the readout pulses sequentially output signals held in the signal holding units 101 to the AF gain circuit 808 through the common signal line 104. The AF gain circuit 808 performs proper gain processing on the sequentially input signals. The multiplexer 809 multiplexes the output signals from the AF gain circuit 808 and outputs the result externally.

FIG. 2 is a circuit diagram illustrating a configuration example of each of the signal holding units 101 and signal processing circuits 103 in FIG. 1. The signal holding unit 101 operates as described above. A photoelectric-conversion element PD may be a photodiode, for example, and outputs electric charges generated by photoelectric conversion to a first node. In FIG. 2, VRS denotes reset voltage, PRS denotes reset pulse, and PSW denotes sensitivity switch pulse. The accumulation circuit has a first amplifying circuit 21, a sensitivity changing switch M11, a reset switch M12, a first capacitor C11 and a second capacitor C12 and has an input terminal connected to the first node and an output terminal connected to the second node. The sensitivity changing switch (first switch) M11 and reset switch (second switch) M12 are serially connected between the first node and the second node. The first capacitor C11 and second capacitor C12 are integral capacitances (hereinafter, called a first integral capacitance and a second integral capacitance), and the first integral capacitance C11 reduces an electric charge conversion coefficient. The first integral capacitance C11 is connected in parallel with the reset switch M12 and has one terminal connected to the second node. The second integral capacitance C12 is connected between the first node and the second node. The sensitivity changing switch M11 is a MOS transistor and changes sensitivity by changing the integral capacitance in the accumulation circuit. The reset switch M12 is a MOS transistor and may be brought into a conductive state simultaneously with the sensitivity changing switch M11 so that a short circuit is established between the input and output of the accumulation circuit to reset the photodiode PD. The first amplifying circuit 21 forms a feedback of the accumulation circuit. The first amplifying circuit 21 is a first differential amplifier circuit having an inverting input terminal connected to a first node, a non-inverting input terminal connected to a node of the reset voltage VRS and an output terminal connected to the second node.

FIG. 2 illustrates the signal processing circuit 103, clamp voltage VGR, a clamp switch PGR, a first noise clamp pulse PTN1, a second noise clamp pulse PTN2, a first signal input pulse PTS1, and a second signal input pulse PTS2. FIG. 2 further illustrates an amplifying circuit 80 having a source follower including a PMOS or an NMOS in its output stage, switches 81 to 85 corresponding to the pulses, a clamp capacitance 86, and an output select switch 90.

The photodiode PD converts light to electric charges and accumulates the converted electric charges. Each of the signal holding units 101 configures an accumulation circuit in which the electric charge occurring in the photodiode PD is transferred to the integral capacitances C11 and C12. When the amplifying circuit 21 is substantially grounded, the terminal potential of the photodiode PD is kept at the reset voltage VRS. In the signal processing circuit 103, when the output stage of the amplifying circuit 80 is configured by an NMOS source follower, the highest value among values of output signals from the plurality of signal processing circuits 103 is detected from the common signal line 104. When the output stage of the amplifying circuit 80 is configured by a PMOS source follower, the lowest value among values of output signals from the plurality of signal processing circuits 103 is detected from the common signal line 104. Two combinations each including the signal processing circuit 103, the common signal line 104 and the common load circuit 400 may be provided for one signal holding unit 101. One of the combinations may include the amplifying circuit 80 of the NMOS source follower output stage, and the other may include the amplifying circuit 80 of the PMOS source follower output stage. This allows simultaneous detection of the highest value and the lowest value as described above from the two common signal lines 104. Alternatively, one common signal line 104 may be provided instead of two common signal lines 104, and the highest value and the lowest value may be detected from the one common signal line 104 in a time-division manner.

Figure 3:
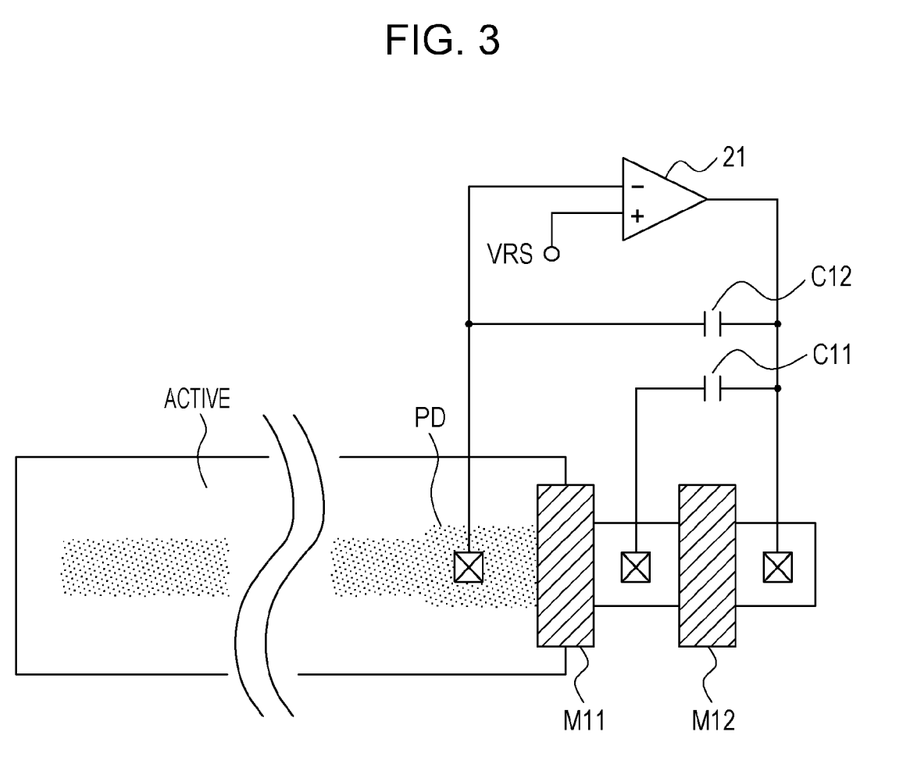
FIG. 3 is a layout diagram illustrating the first exemplary embodiment.

FIG. 3 illustrates a layout example of the signal holding unit 101. FIG. 3 illustrates an N-type active region ACTIVE. The PN photodiode PD includes a P-type diffusion region within the N-type active region. In FIG. 3, like numbers refer to like components in FIG. 2, and the description thereof will be omitted. Each of the photodiodes PD in the AF sensor has a rectangular form having a shorter side in a pixel pitch direction in order to secure sensitivity and improve accuracy of AF detection. At a position where the photodiode PD and a gate of the MOS transistor switch M11 are in contact, a drain-well leakage current due to GIDL occurs. The number of such position is limited to one according to this exemplary embodiment so that a drain-well leakage current due to GIDL may occur at one position that is a minimum.

Figure 5:
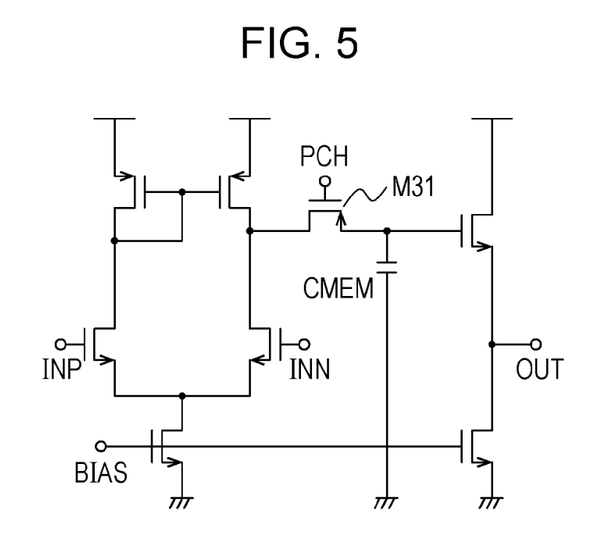
FIG. 5 is a circuit diagram illustrating the first exemplary embodiment.

FIG. 5 is a circuit diagram illustrating a configuration example of the amplifying circuit 21 in FIG. 2. FIG. 5 illustrates a non-inverting input terminal INP, an inverting input terminal INN, an output terminal OUT, a sampling and holding pulse PCH, a storage capacitance CMEM, a current source control pulse BIAS, and a sampling and holding switch M31. The illustrated MOS transistors configure a differential amplifier and a source follower. Note that, the differential input stage and source follower input stage and the sampling and holding switch M31 may have other polarities than those illustrated in FIG. 5 in consideration of the reset voltage VRS and the operation range of the amplifying circuit 21. The sample-and-hold circuit has the sampling and holding switch M31 and storage capacitance CMEM and samples and holds voltage based on the voltage of the second node.

Figure 4:
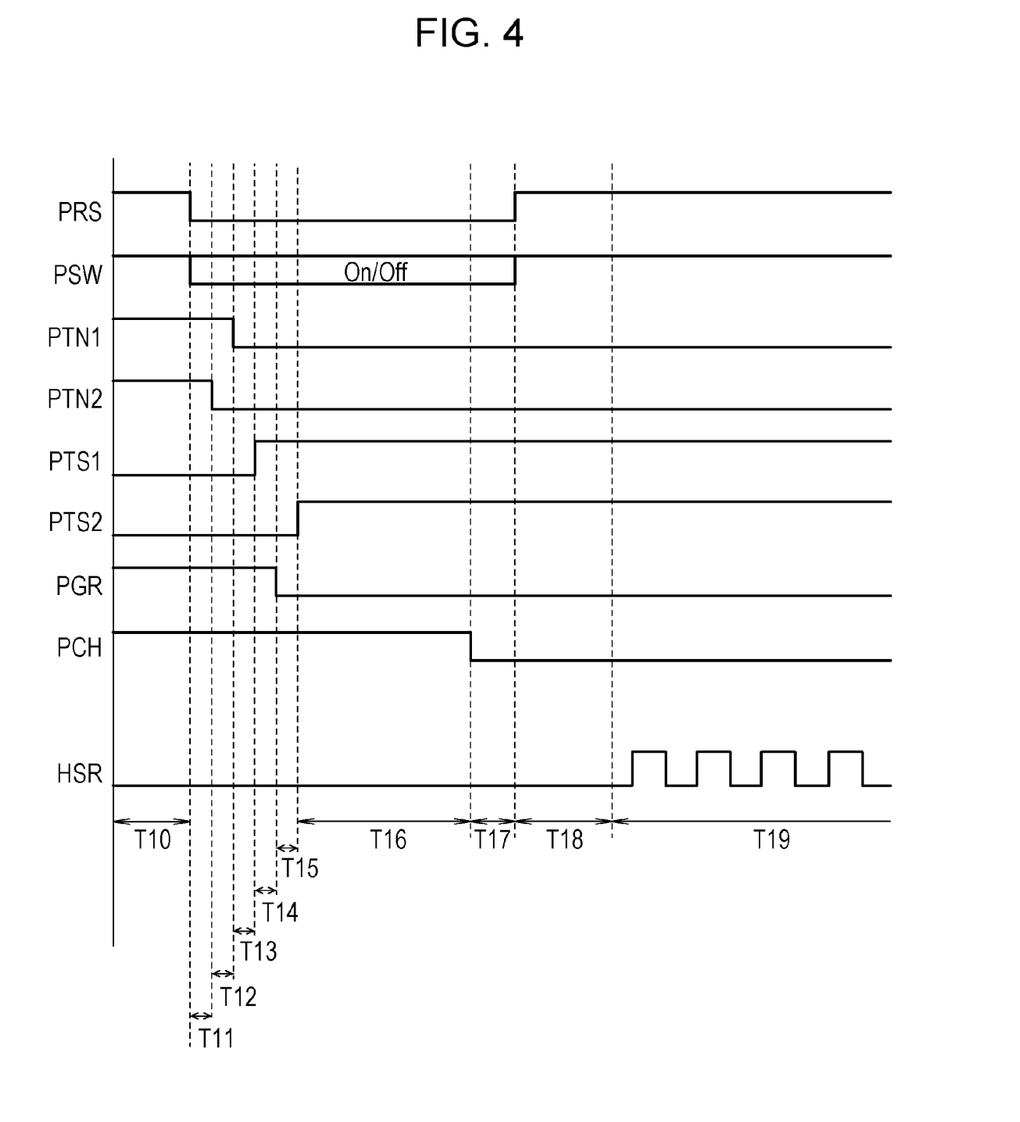
FIG. 4 is a timing chart illustrating the first exemplary embodiment.

One disclosed feature of the embodiments may be described as a process which is usually depicted as a timing chart or timing diagram. A timing diagram may illustrate the timing relationships of several entities, such as signals, events, etc. Although a timing diagram may describe the operations as a sequential process, some operations may be performed in parallel or concurrently. In addition, unless specifically stated, the order of the operations or timing instants may be re-arranged. Furthermore, the timing or temporal distances may not be scaled or depict the timing relationships in exact proportions. FIG. 4 is a timing chart illustrating operation examples of the signal holding unit 101 and signal processing circuit 103 in FIG. 2. The signal names in FIG. 4 correspond to the pulse codes in FIG. 2, and a high level in FIG. 4 indicates that the corresponding switch is ON. FIG. 4 illustrates a driving pulse HSR of the shift register 102.

In a reset period T10 before start of electric charge accumulation in the photodiode PD, the reset pulse PRS, sensitivity switch pulse PSW, and hold pulse PCH have a high level, and the reset switch M12, sensitivity changing switch M11 and sampling and holding switch M31 are turned on. This resets the potential photodiode PD and the storage capacitance CMEM. The terminal of the photodiode PD is reset to a potential resulting from addition of an offset voltage of the amplifying circuit 21 to the reset voltage VRS. At the same time, the noise clamp pulses PTN1 and PTN2 and the clamp pulse PGR are changed to a high level, and the switches 81, 82, and 85 are turned on. Thus, one end of the clamp capacitance 86 of the signal processing circuit 103 is reset to a voltage resulting from the addition of the offset voltages of the amplifying circuits 21 and 80 to the reset voltage VRS, and the other end is reset to the clamp voltage VGR.

In an electric charge accumulation period T11, the reset pulse PRS is changed to a low level, and the reset switch M12 is turned off. Then, the reset operation ends. After that, the photodiode PD generates the amount of electric charges corresponding to the quantity of irradiated light, and the output of the amplifying circuit 21 starts changing in accordance with the amount of electric charges generated in the photodiode PD. In electric charge accumulation periods T11 to T16, the sensitivity switch pulse PSW being changed to a high level or low level may fix the sensitivity changing switch M11 to an ON or OFF state. The values of the integral capacitances are changed to the value of C11+C12 or C12 to change the sensitivity. Normally, electric charges are preferably accumulated by fixing the sensitivity switch pulse PSW until the accumulation is terminated. However, the sensitivity switch pulse PSW may be changed to a high level or a low level intentionally during an electric charge accumulation operation.

In an electric charge accumulation period T12, the noise clamp pulse PTN2 is changed to a low level, and the switch 85 is turned off. In an electric charge accumulation period T13, the noise clamp pulse PTN1 is changed to a low level, and the switch 81 is turned off. In an electric charge accumulation period T14, the signal input pulse PTS1 is changed to a high level, and the switch 84 is turned on. In an electric charge accumulation period T15, the clamp pulse PGR is changed to a low level, the switch 82 is turned off. In an electric charge accumulation period T16, the signal input pulse PTS2 is changed to a high level, and the switch 83 is turned on. With this series of operations, the clamp voltage VGR is held at one terminal of the clamp capacitance 86, and a voltage resulting from addition of offset voltages of the amplifying circuits 21 and 80 to the reset voltage VRS is held at the other terminal for noise cancellation.

In the electric charge accumulation period T16, electric charges generated in the photodiode PD are converted to voltage by the integral capacitance C11 and C12 in the signal holding unit 101, and the voltage is input to the signal processing circuit 103. When the photodiode PD is of a hole storage-type, the output voltage of the signal holding unit 101 decreases, as the electric charge accumulation advances, reset voltage where the vicinity of the VRS is a dark output. When an object has a low luminance, the electric charge accumulation period T16 may be extended to the order of several hundred ms so as to collect many electric charges. In this case, the signal integrity is largely influenced by dark current of the photodiode PD and a minute leakage current of the readout circuit in the signal holding unit 101. A drain-well leakage current, generally called GIDL, is concerned as one mechanism of a minute leakage current of a readout circuit. The GIDL depends on a gate-source voltage generated when a MOS transistor is turned off. In order to reduce a leakage current due to GIDL, it is important that the range of the gate-source voltage is not extended toward an OFF state of the MOS transistor more than necessary when the MOS transistor is OFF. According to this exemplary embodiment, the amplifying circuit 21 is substantially grounded, and the potential of the photodiode PD is fixed to the vicinity of the reset voltage VRS through the electric charge accumulation period T16. The gate voltage when the sensitivity changing MOS transistor M11 and reset MOS transistor M12 are OFF, is desirably a voltage which may minimize the source-drain sub-threshold leakage current and a leakage current due to GIDL even in consideration of variations in manufacturing processes and operation environments.

According to this exemplary embodiment, through the electric charge accumulation period T16, the change of the sensitivity switch pulse PSW to a high level or a low level may change the integral capacitance to C11+C12 or C12. Here, in either case where the sensitivity switch pulse PSW has a high level or a low level, there is only one MOS transistor that is OFF and has a source (or drain) connected to the first node of the photodiode PD. As a result, even low-luminance long-period accumulating operation may reduce a leakage current due to GIDL and increase the signal integrity, which may provide a better AF performance. Further, as described above, a first signal processing circuit 103 outputs the highest value among values of output signals from the plurality of signal holding units 101 to the common signal line 104, and a second signal processing circuit 103 outputs the lowest value among values of output signals from the plurality of signal holding units 101 to the common signal line 104.

In an electric charge accumulation end period T17, the sampling and holding pulse PCH of the amplifying circuit 21 is changed to a low level, and the hold switch M31 is thus turned off. This causes the amplifying circuit 21 to be in an open loop state and continuously hold the output voltage when the sampling and holding pulse PCH is changed to a low level.

In an electric charge accumulation end period T18, the reset pulse PRS and sensitivity switch pulse PSW are changed to a high level, and the reset MOS transistor M12 and sensitivity changing MOS transistor M11 are turned on again. At this time, the photodiode PD is fixed to the output voltage of the amplifying circuit 21 when the sampling and holding pulse PCH is changed to a low level. As an alternative driving method, an operation may be considered which keeps the reset pulse PRS to have a low level and the sensitivity switch pulse PSW to have a high level or low level in the electric charge accumulation end period T18. In the electric charge accumulation end period T18, electric charges are held in the integral capacitance C12, and the potential of the photodiode PD starts to increase. After a while, the reset MOS transistor M12 and sensitivity changing MOS transistor M11 are turned on to perform an overflow operation. Therefore, there is no concern that excessive carriers enter adjacent pixels and result in a false signal. One of the driving methods may be applied in accordance with the size of the timing generating circuit that generates the pulses illustrated in FIG. 4.

In a period T19, because of the driving pulses HSR of the shift registers 102, the plurality of shift registers 102 sequentially output a high level, and the output select switches 90 of the plurality of signal processing circuits 103 are sequentially turned on. Thus, signals held in the plurality of signal holding unit 101 are sequentially output to the common signal line 104 through the plurality of signal processing circuits 103.

According to this exemplary embodiment, since accumulation circuits are used for readout circuits in the signal holding units 101, a gate-source voltage difference may be minimized when transistors connected to photodiodes PD are turned off. Each of the accumulation circuits has the switch M11 for changing an integral capacitance thereof, and the number of MOS transistor is limited to one which has a source or a drain (controlled terminal) connected to the first node of the photodiode PD. Thus, the signal holding units 101 may suppress a leakage current due to GIDL without impairing its signal retention function. As a result, an auto-focus sensor may be provided which may exhibits good performance even under low luminance.

Second Exemplary Embodiment

Figure 6:
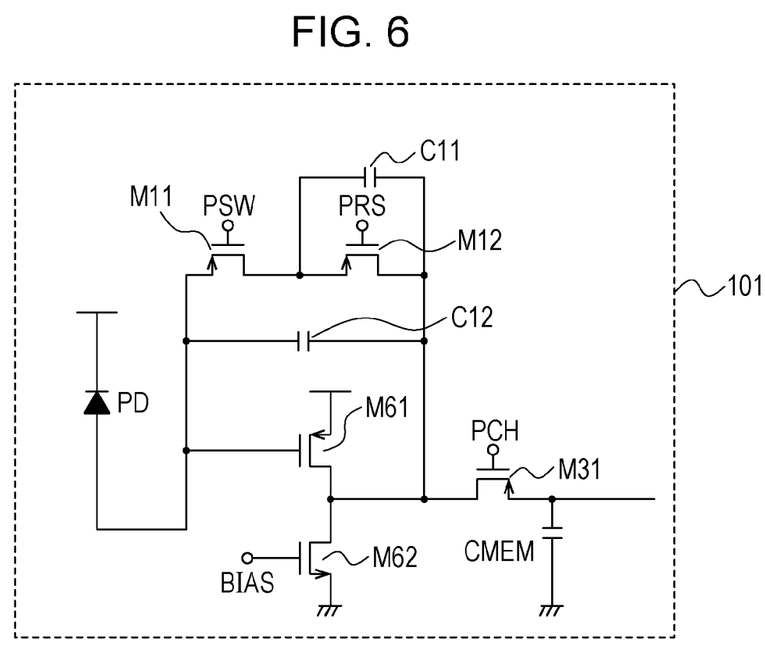
FIG. 6 is a circuit diagram illustrating a second exemplary embodiment.

FIG. 6 is a circuit diagram illustrating a configuration example of a signal holding unit 101 according to a second exemplary embodiment. This exemplary embodiment is different from the first exemplary embodiment in that a common-source first inverting amplifying circuit is provided instead of the amplifying circuit 21 in FIG. 2. The first inverting amplifying circuit has MOS transistors M61 and M62 and has an input terminal connected to the first node and an output terminal connected to the second node. The second exemplary embodiment is further different from the first exemplary embodiment in that the sample-and-hold circuit (sampling and holding switch M31 and storage capacitance CMEM) in FIG. 5 is disposed in an output stage of the signal holding unit 101. The sample-and-hold circuit has a sampling and holding switch M31 and a storage capacitance CMEM and has an input terminal connected to a second node.

According to this exemplary embodiment, a lower number of MOS transistors are included in the amplifying circuit 21 to reduce a layout area of a readout circuit, as compared with the first exemplary embodiment. While two current sources are controlled by a current-source control pulse BIAS according to the first exemplary embodiment (FIG. 5), one current source is controlled according to this exemplary embodiment (FIG. 6) so that the power consumption of the AF sensor may be reduced.

The circuit operation in FIG. 6 is the same as that of the first exemplary embodiment except for the following points. In the reset period T10 in FIG. 4, a reset pulse PRS and a sensitivity switch pulse PSW are changed to a high level, and a short circuit is established between the input terminal and the output terminal of the inverting amplifying circuit. The MOS transistor M61 is driven with a drain current from the MOS transistor M62 operating with a constant current source. The potentials of the gate and drain of the MOS transistor M61 and photodiode PD are fixed to the potential of voltage reduced from power supply voltage by the threshold voltage and overdrive voltage of the MOS transistor M61.

In the electric charge accumulation end period T17, the sampling and holding pulse PCH is changed to a low level, and the sampling and holding switch M31 is thus turned off. Because the sampling and holding switch M31 is turned off, the output of the signal holding unit 101 keeps holding an output voltage at a time when the sampling and holding pulse PCH is changed to a low level.

According to this exemplary embodiment, the common-source inverting amplifying circuit including the MOS transistor M61 and M62 may have either PMOS or NMOS transistor as an input transistor. A cascode stage may be provided for a higher amplification factor.

According to this exemplary embodiment, the amplifying circuit 21 of the first exemplary embodiment is replaced by a common source inverting amplifying circuit including the MOS transistors M61 and M62. Thus, an AF sensor may be provided which may improve the signal integrity in a low-luminance long-period accumulating operation and have a reduced area and power consumption.

Third Exemplary Embodiment

Figure 7:
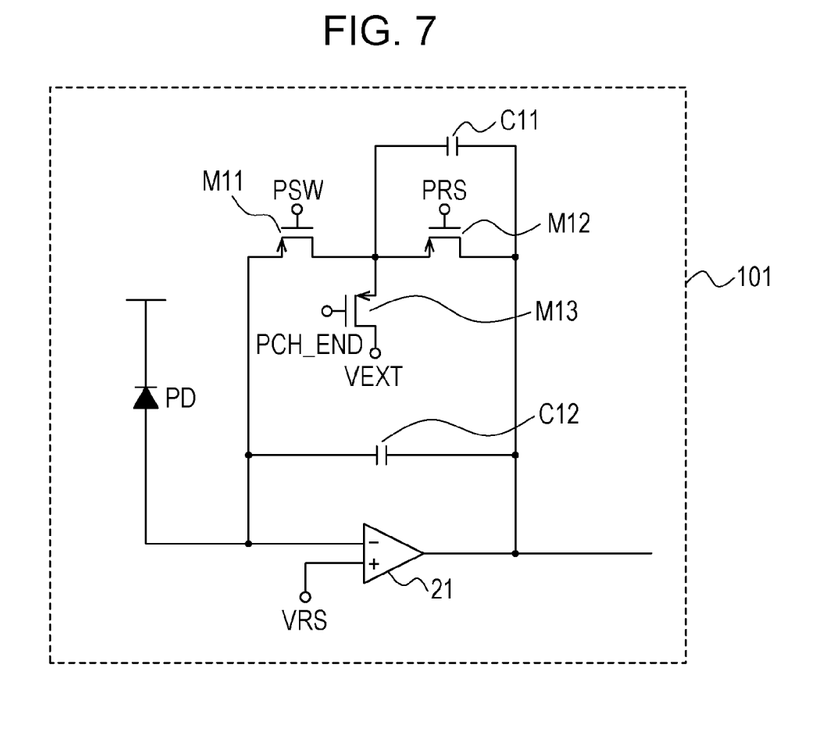
FIG. 7 is a circuit diagram illustrating a third exemplary embodiment.

FIG. 7 is a circuit diagram illustrating a configuration example of a signal holding unit 101 according to a third exemplary embodiment. This exemplary embodiment (FIG. 7) is different from the first exemplary embodiment (FIG. 2) in that the circuit illustrated in FIG. 7 further includes a second reset switch (third switch) M13, a second reset pulse PCH_END and a second reset voltage VEXT. The second reset switch M13 is a switch usable for fixing a node between the sensitivity changing switch M11 and the first reset switch M12 to a second reset voltage VEXT.

Figure 9:
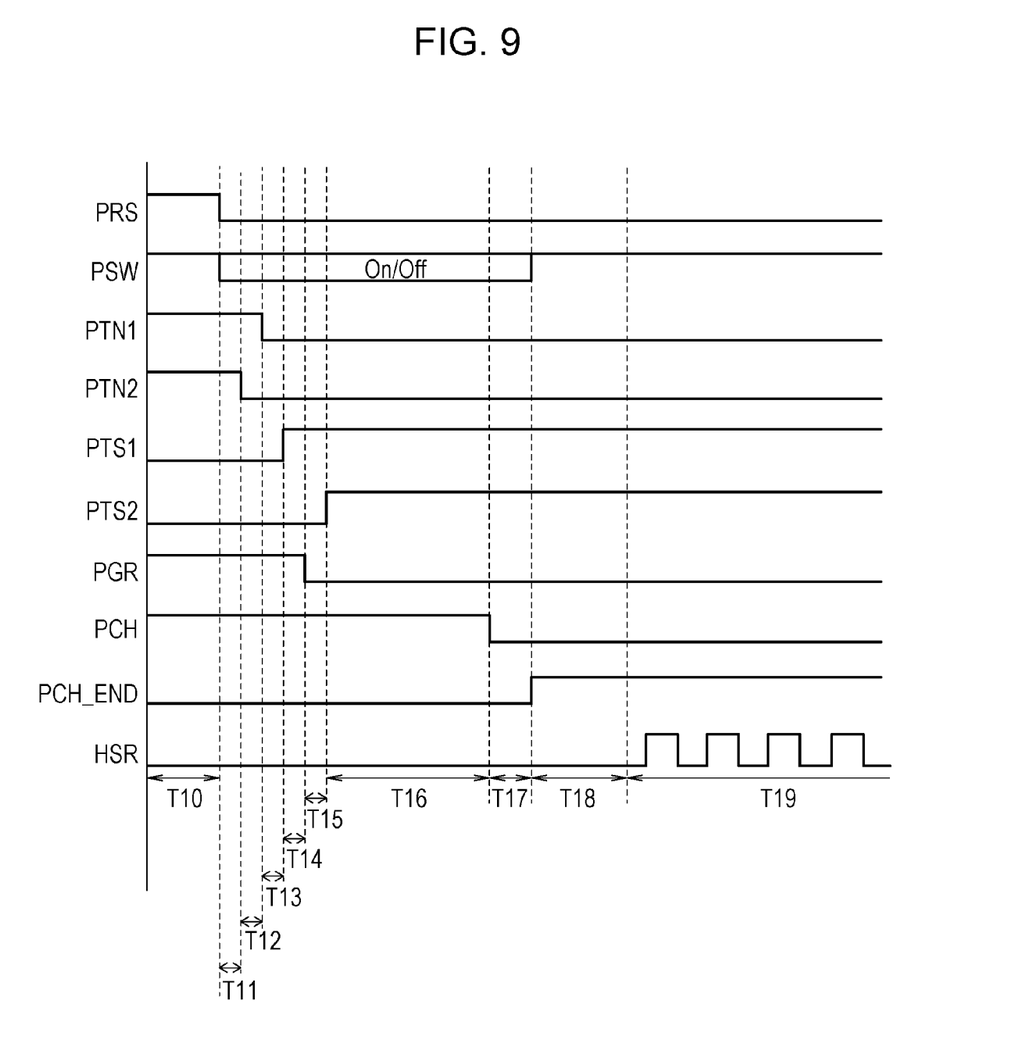
FIG. 9 is a timing chart illustrating the third exemplary embodiment.

FIG. 9 is a timing chart illustrating operation examples of the signal holding unit 101 according to this exemplary embodiment. The description on pulses for operations according to this exemplary embodiment the same as those of the first exemplary embodiment (FIG. 4) will be omitted. In periods T10 to T17, the second reset pulse PCH_END is fixed to a low level, and the second reset switch M13 is OFF. In a period T18 after the end of the electric charge accumulation, the first reset pulse PRS has a low level, sensitivity switch pulse PSW is changed to a high level, the reset pulse PRS has a low level, and the second reset pulse PCH_END is changed to a high level. The first reset switch M12 is turned off, and the second reset switch M13 and the sensitivity changing switch M11 are turned on. Thus, the photodiode PD is fixed to the second reset voltage VEXT.

According to the first exemplary embodiment, excessive carriers occurring in a photodiode PD in the electric charge accumulation end period T18 enter an output stage of the amplifying circuit 21. With an object having a high luminance, there may be a concern that the entering excessive carriers may fluctuate the driving current in the output stage of the amplifying circuit 21 and may fluctuate output voltage of the amplifying circuit 21. However, according to this exemplary embodiment, excessive carriers occurring in a photodiode PD are drained through the reset MOS transistor M13 to the second reset voltage VEXT, which does not fluctuate output voltage of the amplifying circuit 21 under high luminance conditions. The potential of the second reset voltage VEXT is set to a potential which allows the reset MOS transistor M13 to sufficiently drive the excessive carriers when the second reset pulse PCH_END has a high level.

This exemplary embodiment further includes the reset MOS transistor M13, second reset pulse PCH_END and second reset voltage VEXT in addition to the configuration of the first exemplary embodiment. Thus, an AF sensor may be provided which may improve the signal integrity in a low-luminance long-period accumulating operation and in which signal fluctuations under high luminance conditions may be suppressed.

Fourth Exemplary Embodiment

Figure 8:
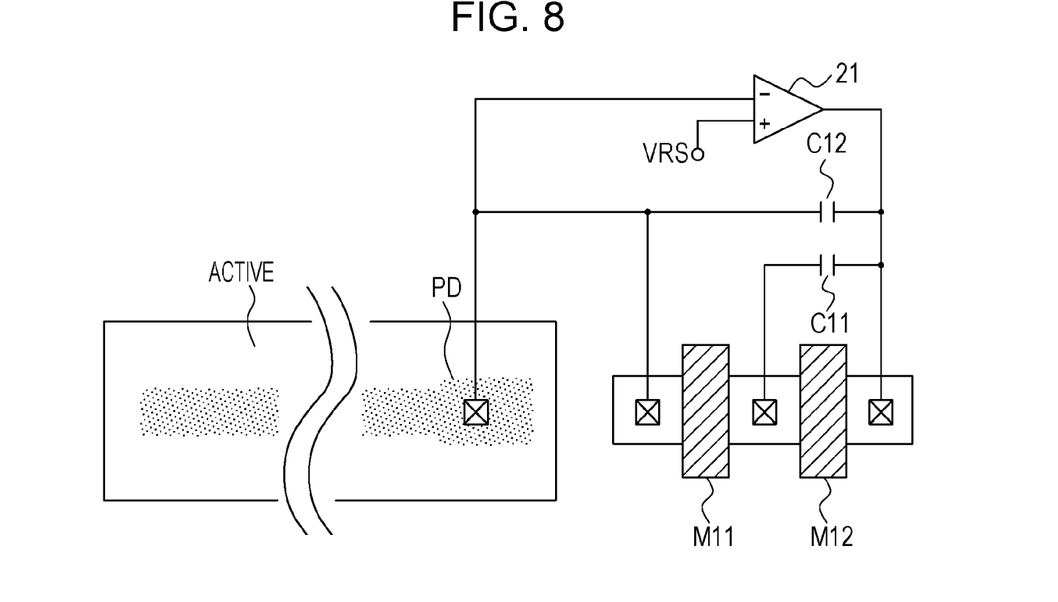
FIG. 8 is a layout diagram illustrating a fourth exemplary embodiment.

FIG. 8 illustrates a layout of a signal holding unit 101 according to a fourth exemplary embodiment. According to this exemplary embodiment (FIG. 8), an active region of a photodiode PD and an active region of a drain region of the sensitivity changing switch M11 are separated, as compared with the layout in FIG. 3. This configuration may increase the efficiency of the layout by providing a degree of freedom to the arrangement of the sensitivity changing switch M11 with respect to the photodiode PD. As a result, an area-saving AF sensor may be provided which may improve the signal integrity in a low-luminance long-period accumulating operation.

Fifth Exemplary Embodiment

Figure 10:
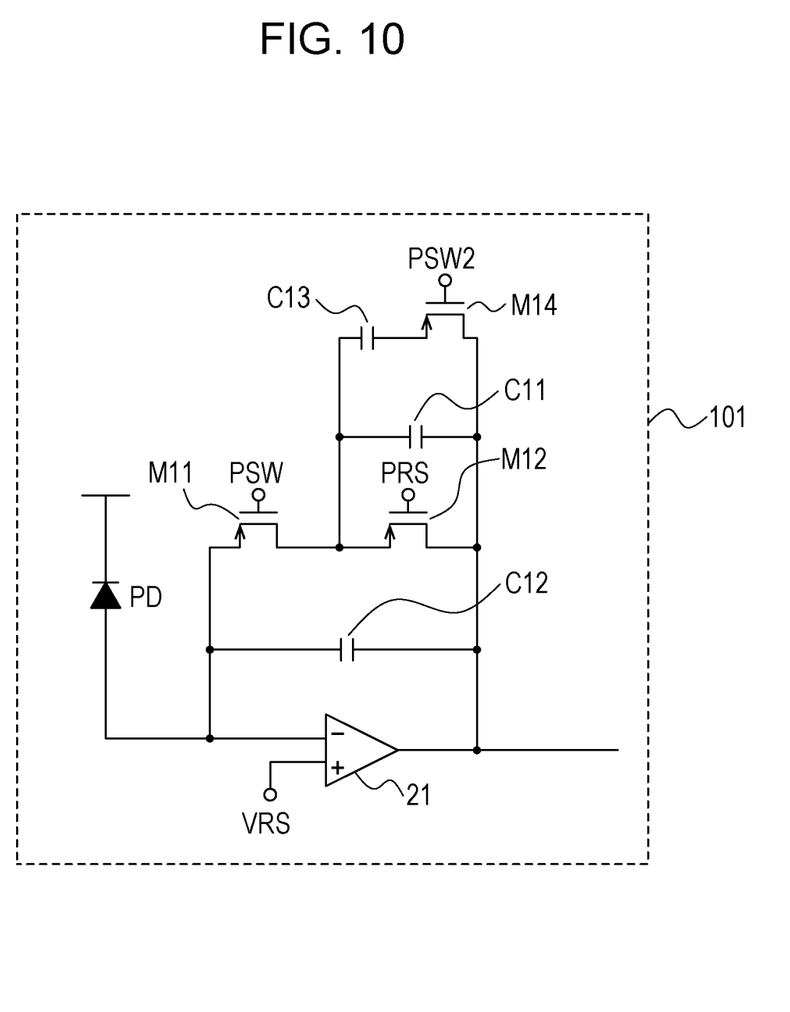
FIG. 10 is a circuit diagram illustrating a fifth exemplary embodiment.

FIG. 10 is a circuit diagram illustrating a configuration example of a signal holding unit 101 according to a fifth exemplary embodiment. This exemplary embodiment (FIG. 10) further includes a third capacitance C13 and a second sensitivity changing switch (fourth switch) M14 in addition to the configuration in FIG. 2. The circuit in which the integral capacitance C13 and second sensitivity changing switch M14 are serially connected is connected in parallel with the integral capacitance C11. The second sensitivity changing switch M14 is connected to the first sensitivity changing switch M11 through the integral capacitance C13. The integral capacitance C13 has one terminal connected to a node between the first sensitivity changing switch M11 and the reset switch M12. The second sensitivity changing switch M14 is connected between the other terminal of the integral capacitance C13 and the second node. This configuration allows switching of the integral capacitance of the accumulation circuit between C12, C12+C11, and C12+C11+C13. The lowest integral capacitance, C12, is often used for a highest electric charge conversion coefficient desired in a low-luminance long-period accumulation for which GIDL leakage current is concerned. FIG. 10 illustrates the MOS transistor M14 that is further added. When the integral capacitance is set to C12, one MOS transistor in an OFF state has a source connected to the photodiode PD. In other words, the signal holding unit 101 may reduce an influence of GIDL leakage current, like FIG. 2. As a result, different proper integral capacitances and electric charge conversion coefficients are used in accordance with the luminance of an object so that an AF sensor exhibiting high accuracy for a wide luminance range may be provided which may also improve the signal integrity in a low luminance, long-period accumulating operation.

The ON/OFF timing of the second sensitivity changing switch M14 is the same as that of the sensitivity switch pulse PSW in FIG. 4. During the periods T11 to T17, if the integral capacitance C13 is added to the integral capacitances, the second sensitivity changing switch M14 is turned on. If the integral capacitance C13 is not added to the integral capacitances, the second sensitivity changing switch M14 is turned off. Further, the number of integral capacitance changing patterns may be increased by providing a plurality of the serial connection configurations each including a capacitance and a switch equivalent to the integral capacitance C13 and the second sensitivity changing switch M14 in parallel with respect to the integral capacitance C11.

Sixth Exemplary Embodiment

Figure 11:
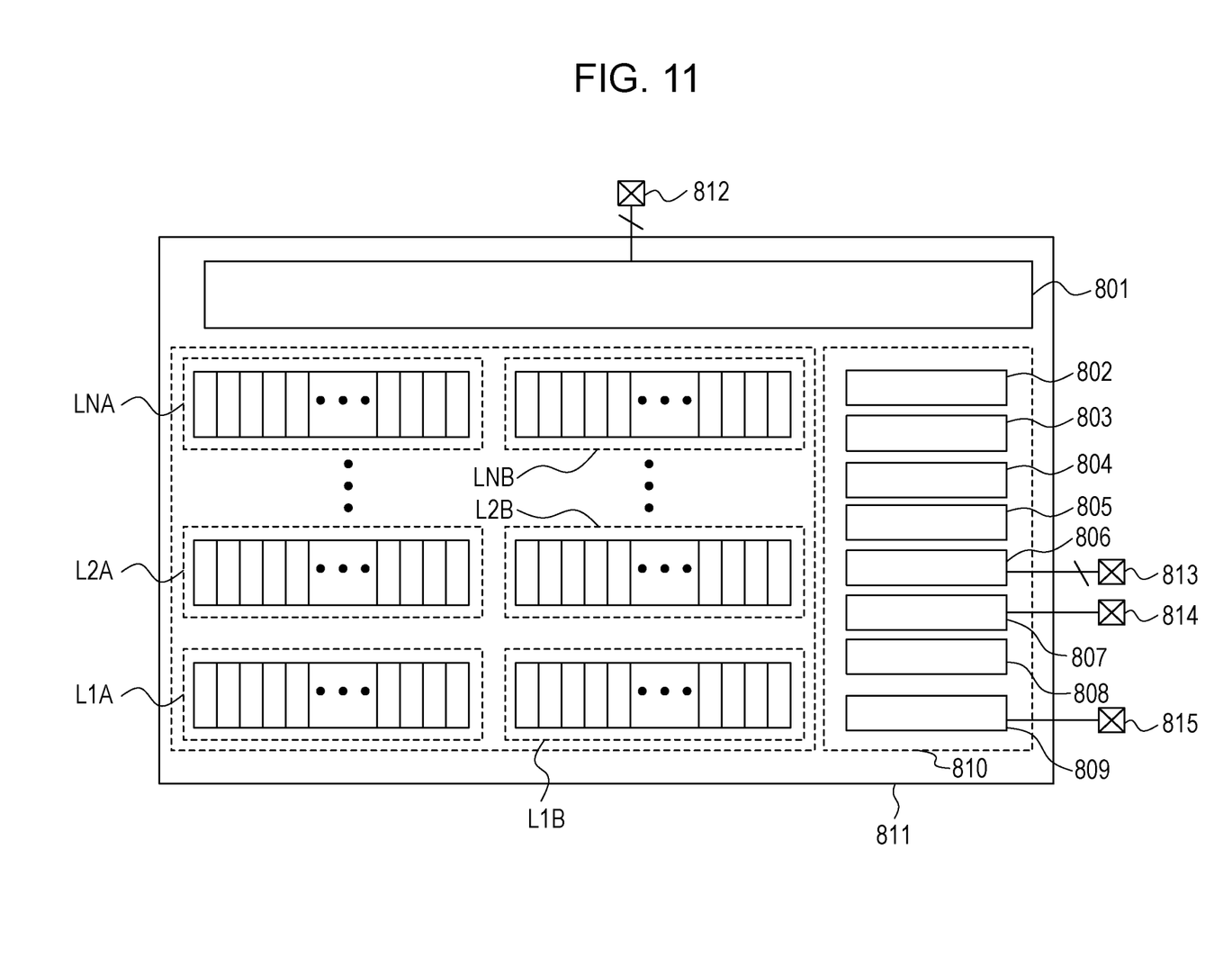
FIG. 11 is a block diagram illustrating an integrated circuit according to a sixth exemplary embodiment.

FIG. 11 is a block diagram illustrating a configuration example of a phase difference focus detection apparatus (hereinafter, called an AF sensor) having the photoelectric conversion apparatus according to the fifth exemplary embodiment. An AF sensor 811 includes a sensor block having line sensor units L1A, L2A, . . . and L1B, L2B, a logic block 801 capable of generating timing signals for an external interface and the AF sensor, and an analog circuit block 810. The line sensor unit L1A and so on correspond to the signal holding units 101, shift registers 102 and signal processing circuits 103 in FIG. 1. The analog circuit block 810 has an AGC circuits 802 to 805, a reference voltage/current generating circuit 806 configured to generate reference voltage and reference current to be used in the line sensor units, a thermometer circuit 807, and an AF gain circuit 808, and a multiplexer 809. The AGC circuits 802 to 805 correspond to the buffer circuit 601, analog operating unit 602 and comparator 603, respectively, in FIG. 1. The AF sensor 811 has a serial communication terminal 812, a reference voltage output terminal 813, an external-thermometer-connected terminal 814, and an analog signal output terminal 815. The logic block 801 controls driving timing for the AF sensor 811 through external serial communication via the serial communication terminal 812. According to this exemplary embodiment, an AF sensor according to any one of the first to fifth exemplary embodiments may be used to realize a highly accurate focus detection operation.

Seventh Exemplary Embodiment

Figure 12:
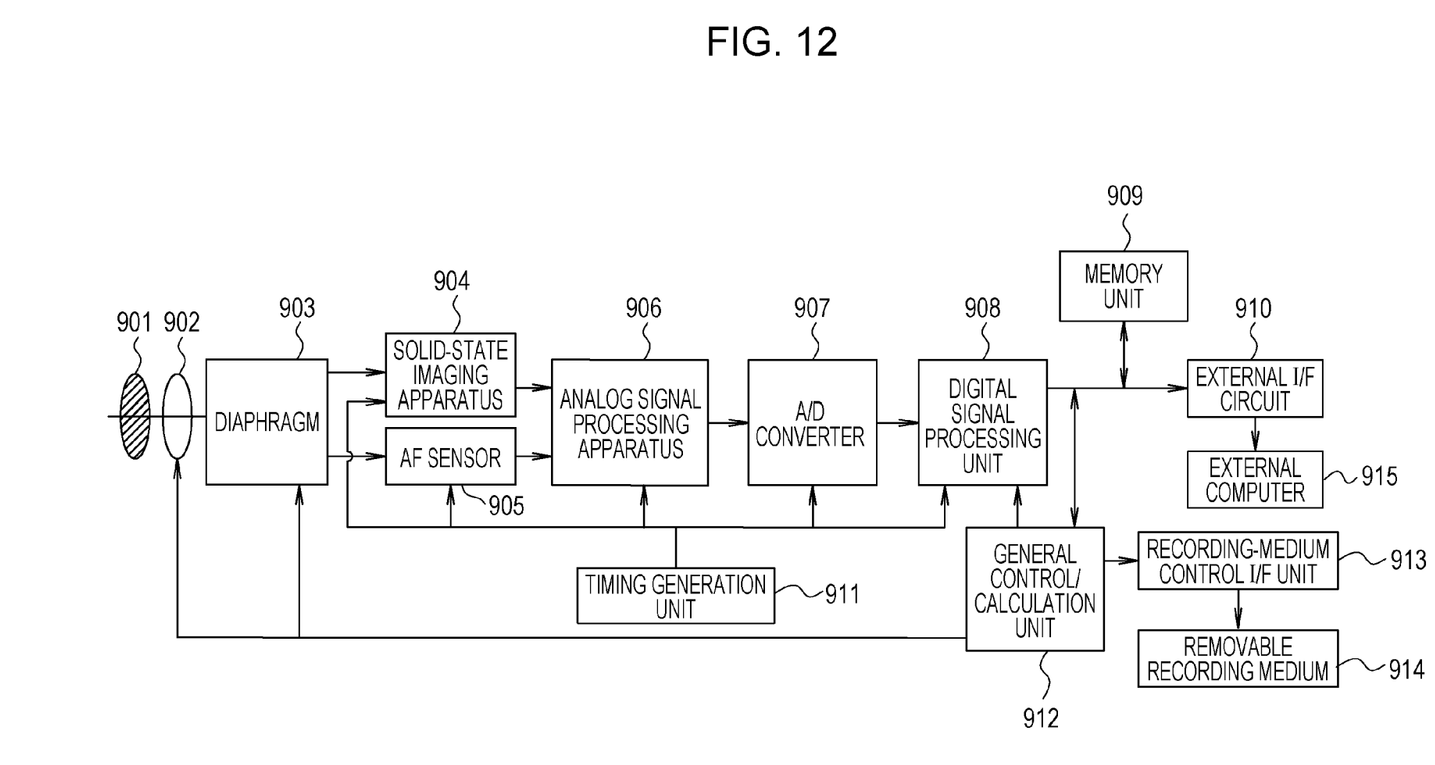
FIG. 12 is a block diagram illustrating a camera system according to a seventh exemplary embodiment.

FIG. 12 is a block diagram illustrating a configuration example of an imaging system according to a seventh exemplary embodiment. The imaging system includes a barrier 901, a lens 902, and a diaphragm 903. The barrier 901 is configured to protect the lens 902. The lens 902 condenses light incident on an object to a solid-state imaging apparatus 904 and an AF sensor 905. The diaphragm 903 is configured to adjust quantity of light having passed through the lens 902. The solid-state imaging apparatus 904 acquires an optical image of an object focused with the lens 902. The AF sensor 905 has the photoelectric conversion apparatus according to any one of the aforementioned exemplary embodiments. The imaging system further includes an analog signal processing apparatus 906 and an A/D converter 907. The analog signal processing apparatus 906 is configured to process signals output from the solid-state imaging apparatus 904 and AF sensor 905. The A/D converter 907 is configured to perform analog-digital conversion on signals output from the signal processing apparatus 906. The imaging system further includes a digital signal processing unit 908, a memory unit 909, an external I/F circuit 910, and a timing generation unit 911. The digital signal processing unit 908 is configured to perform a correction process on image data output from the A/D converter 907 and compress data. The memory unit 909 is configured to temporarily store image data, the external I/F circuit 910 is configured for communication with an external computer, for example. The timing generation unit 911 is configured to output timing signals to the digital signal processing unit 908 and so on. The imaging system further includes a general control/calculation unit 912, a recording-medium control I/F unit 913, a removable recording medium 914 and an external computer 915. The general control/calculation unit 912 is configured to control operations and the overall camera. The removable recording medium 914 may be a semiconductor memory to or from which acquired image data may be recorded or read.

Next, photographing operations by the imaging system will be described. The barrier 901 is opened. On the basis of a signal output from the AF sensor 905, the general control/calculation unit 912 calculates a distance to an object by phase difference detection. After that, the lens 902 is driven on the basis of the calculation result. Whether the object is in focus or not is determined again. If not, auto-focusing control which drives the lens 902 again is performed. If in focus, an accumulating operation by the solid-state imaging apparatus 904 starts. When the electric charge accumulating operation by the solid-state imaging apparatus 904 ends, an image signal output from the solid-state imaging apparatus 904 undergoes analog-digital conversion in the A/D converter 907, passes through the digital signal processing unit 908 and is written to the memory unit 909 by the general control/calculation unit 912. After that, data accumulated in the memory unit 909 are recorded to the recording medium 914 through the recording-medium control I/F unit 910 under control of the general control/calculation unit 912. The data may be input directly to a computer through the external I/F 910.

According to the first to seventh exemplary embodiments, accumulation circuits are used in the signal holding units 101 to minimize a difference between gate and source voltages of transistors connected to photodiodes PD therein when the transistors are turned off. Each of the accumulation circuits has a switch for changing an integral capacitance value thereof, and the number of switch in which a controlled terminal is connected to a photodiode PD is limited to one. Thus, a leakage current due to GIDL may be suppressed without impairing its signal retention function. As a result, an auto-focus sensor may be provided which may exhibits good performance even under low luminance.

It should be noted that the aforementioned exemplary embodiments are merely given for illustration of embodiments, and the technical scope of the disclosure should not be interpreted limitedly therefrom. In other words, changes, modifications and/or alterations in various forms may be made to the disclosure without departing from its technical spirit and main features.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2013-110247, filed May 24, 2013, which is hereby incorporated by reference herein in its entirety.

What is claimed is:

1. A photoelectric conversion apparatus comprising:
a photoelectric-conversion element configured to output electric charges generated by photoelectric conversion to a first node; and
an accumulation circuit having an input terminal connected to the first node and being capable of changing an integral capacitance value, wherein
in an electric charge accumulation period, number of drain or source of a MOS transistor in an OFF state connected to the first node is one;
the accumulation circuit has an output terminal connected to a second node; and
the accumulation circuit comprises:
a first switch and a second switch serially connected between the first node and the second node;
a first capacitance connected in parallel with the second switch and having one terminal connected to the second node; and
a second capacitance connected between the first node and the second node.

2. The photoelectric conversion apparatus according to claim 1, wherein the first switch and the second switch are turned on before electric charge accumulation is started by the photoelectric-conversion element to reset the potential of the photoelectric-conversion element, the second switch is turned off in an electric charge accumulation period of the photoelectric-conversion element, and the first switch is fixed to an ON or OFF state to change the integral capacitance value.

3. The photoelectric conversion apparatus according to claim 1, wherein the first switch and the second switch are MOS transistors; and
a gate voltage generated when the first switch and the second switch are in an OFF state is a voltage that allows a minimum leakage current due to sub-threshold leakage current and GIDL.

4. The photoelectric conversion apparatus according to claim 2, wherein the first switch and the second switch are MOS transistors; and
a gate voltage generated when the first switch and the second switch are in an OFF state is a voltage that allows a minimum leakage current due to sub-threshold leakage current and GIDL.

5. The photoelectric conversion apparatus according to claim 1, wherein the accumulation circuit has a first differential amplifier circuit having an inverting input terminal connected to the first node, a non-inverting input terminal connected to a reset voltage node, and an output terminal connected to the second node; and a sample-and-hold circuit configured to sample and hold voltage based on voltage of the second node.

6. The photoelectric conversion apparatus according to claim 2, wherein the accumulation circuit has a first differential amplifier circuit having an inverting input terminal connected to the first node, a non-inverting input terminal connected to a reset voltage node, and an output terminal connected to the second node; and
 a sample-and-hold circuit configured to sample and hold voltage based on voltage of the second node.

7. The photoelectric conversion apparatus according to claim 3, wherein the accumulation circuit has a first differential amplifier circuit having an inverting input terminal connected to the first node, a non-inverting input terminal connected to a reset voltage node, and an output terminal connected to the second node; and
 a sample-and-hold circuit configured to sample and hold voltage based on voltage of the second node.

8. The photoelectric conversion apparatus according to claim 1, wherein the accumulation circuit has a first amplifying circuit having an input terminal connected to the first node and an output terminal connected to the second node.

9. The photoelectric conversion apparatus according to claim 1, wherein the accumulation circuit has a third switch configured to fix a node between the first switch and the second switch to a reset voltage.

10. The photoelectric conversion apparatus according to claim 9, wherein the second switch and the third switch are turned off in an electric charge accumulation period of the photoelectric-conversion element, and when the first switch is fixed to ON or OFF, the integral capacitance value is changed, and after the electric charge accumulation of the photoelectric-conversion element ends, the first switch and the third switch are turned on and the second switch is turned off.

11. The photoelectric conversion apparatus according to claim 1, wherein the accumulation circuit has:
 a third capacitance having a first terminal connected to a node between the first switch and the second switch; and
 a fourth switch connected between a second terminal of the third capacitance and the second node.

12. An imaging system comprising:
 the photoelectric conversion apparatus according to claim 1; and
 a lens configured to condense incident light to the photoelectric conversion apparatus.

* * * * *